United States Patent Office 3,247,211
Patented Apr. 19, 1966

3,247,211
CYANOMETHYLIDENE QUINOLINES
Max A. Weaver, David J. Wallace, and James M. Straley, Kingsport, Tenn., assignors to Eastman Kodak Company, Rochester, N.Y., a corporation of New Jersey
No Drawing. Filed Jan. 18, 1963, Ser. No. 252,284
9 Claims. (Cl. 260—287)

This invention relates to novel methine compounds particularly useful as dyestuffs.

The methine compounds of the invention have the general formula

I

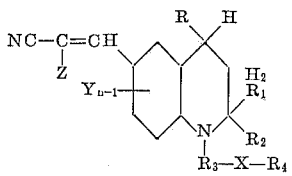

wherein:

R, $R_1$ and $R_2$ each=a hydrogen atom or a lower alkyl group of 1 to 4 carbon atoms, straight or branch-chained, substituted or unsubstituted, particularly methyl, $R_3$=a lower alkylene group of 1 to 4 carbon atoms, straight or branch-chained, substituted or unsubstituted, e.g., —$CH_2CH_2$— and —$CH_2CH_2CHOHCH_2$—, $R_4$=a lower alkyl radical of from 1 to 4 carbon atoms, straight or branch-chained, substituted or unsubstituted; monocyclic and bicyclic aryl radicals of the benzene and naphthalene series, or a lower cycloalkyl radical, $$X = -O\overset{O}{\underset{\|}{C}}-,\ -O\overset{O}{\underset{\|}{C}}NH-,\ -NHCONH-,\ -NHCO-\text{ or }-NHCOO-$$

$Y_{n-1}$=the substituents if any in at least one of the 5-, 7- or 8-positions of the tetrahydroquinoline nucleus wherein Y is a lower alkyl group of 1 to 4 carbon atoms straight or branch-chained, substituted or unsubstituted, or a lower alkoxyl group straight or branch-chained, substituted or unsubstituted, $n$=a positive integer from 1 to 4, Z=a cyano or amido radical, or a lower carboalkoxy radical, including substituted and unsubstituted lower carboalkoxy radicals such as —$COOCH_2CH_2CN$, —$COOCH_2CH_2OCH_3$, —$COOC_2H_5$, —$COOC_3H_7$, —$COOCH_2C_6H_5$ and —$COOC_4H_9$-i.

The methine compounds of Formula I above are prepared as described in the examples by condensing nitriles containing an active methylene group with formylated tetrahydroquinolines II according to the following reaction.

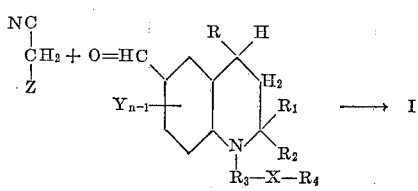

wherein R, $R_1$, $R_2$, $R_3$, $R_4$, X, $Y_{n-1}$ and Z have the same meaning as given above. A typical methine compound has the formula shown in Example 1 below.

The formylated compounds of Formula II are prepared as described in the examples by reacting 1-hydroxyalkyl-1,2,3,4-tetrahydroquinolines or 1-aminoalkyl-1,2,3,4-tetrahydroquinolines with arylisocyanates, aliphatic or aromatic carboxylic acid anhydrides or acid chlorides, or alkyl chloroformates so as to obtain the —$R_3$—X—$R_4$ radical in the 1-position of the tetrahydroquinoline nucleus. Formylation is then carried out by reaction of these compounds at the formyl group with dimethyl formamide and phosphorous oxychloride.

Representative tetrahydroquinolines useful in preparing the methine compounds are:

1-(β-aminoethyl)-2,7-dimethyl-1,2,3,4-tetrahydroquinoline
1-(γ-aminopropyl)-2,7-dimethyl-1,2,3,4-tetrahydroquinoline
1-(β-aminoethyl)-2,2,4,7-tetramethyl-1,2,3,4-tetrahydroquinoline
1-(β-aminoethyl)-2,2,4-trimethyl-1,2,3,4-tetrahydroquinoline
1-(γ-aminopropyl)-2,2,4,7-tetramethyl-1,2,3,4-tetrahydroquinoline
1-(β-aminoethyl)-2-isopropyl-7-methyl-1,2,3,4-tetrahydroquinoline
1-(β-aminoethyl)-2,4,7-trimethyl-1,2,3,4-tetrahydroquinoline
1-(β-aminoethyl)-2,5,8-trimethyl-1,2,3,4-tetrahydroquinoline
1-(β-aminoethyl)-1,2,3,4-tetrahydroquinoline
1-(β-aminoethyl)-2-methyl-7-methoxy-1,2,3,4-tetrahydroquinoline
1-(β-hydroxyethyl)-2,7-dimethyl-1,2,3,4-tetrahydroquinoline
1-(γ-hydroxypropyl)-2,7-dimethyl-1,2,3,4-tetrahydroquinoline
1-(β-hydroxyethyl)-2,2,4,7-tetramethyl-1,2,3,4-tetrahydroquinoline
1-(β-hydroxyethyl)-2,2,4-trimethyl-1,2,3,4-tetrahydroquinoline
1-(γ-hydroxypropyl)-2,2,4,7-tetramethyl-1,2,3,4-tetrahydroquinoline
1-(β-hydroxyethyl)-2-isopropyl-7-methyl-1,2,3,4-tetrahydroquinoline
1-(β-hydroxyethyl)-2,4,7-trimethyl-1,2,3,4-tetrahydroquinoline
1-(β-hydroxyethyl)-2,5,8-trimethyl-1,2,3,4-tetrahydroquinoline
1-(β-hydroxyethyl)-1,2,3,4-tetrahydroquinoline
1-(β-hydroxyethyl)-2-methyl-7-methoxy-1,2,3,4-tetrahydroquinoline As mentioned above, these 1-aminoalkyl and 1-hydroxyalkyl substituted intermediates are reacted so as to obtain the —$R_3$—X—$R_4$ substituted compounds which are then formylated and then reacted with the appropriate nitrile to obtain the methine compounds of the invention.

As will be apparent from the examples herein, the radicals R, $R_1$, $R_2$, $R_3$, $R_4$, X, Y and Z may be varied widely to produce methine compounds having good dyeing properties. In particular, the radical $R_4$ designated herein as a monocyclic or bicyclic aryl radical of the benzene or naphthalene series, may be either naphthalene unsubstituted or substituted in one of the nuclear positions, or phenyl unsubstituted or substituted in the ortho, meta or para positions, by one of the following radicals which will ordinarily be attached to the radical $R_4$, which radical is attached to the —$R_3$—X— radical of the tetrahydroquinoline nucleus prior to the formylation reaction and reaction of the formylated compounds with the appropriate nitrile to obtain the methine compounds: alkyl, especially lower alkyl; alkoxy, especially lower alkoxy and dialkoxy; halogen, e.g., bromine and iodine; carboalkoxy, e.g., —$COOCH_3$; hydroxyalkyl, e.g. hydroxyethyl; alkoxyalkyl, e.g., methoxyethyl; phenoxyalkyl, e.g., phenoxyethyl; alkylthio, e.g., ethylthio; alkylsulfonyl, e.g., methylsulfonyl; phenylalkylsulfonyl, e.g., benzylsulfonyl; phenylalkylthio, e.g., benzylthio; acyl, e.g., acetyl; acetamido; acyloxy, e.g., acetoxy; carbomoyl, e.g., phenylcarbamoyl; cyano; acetoxyalkyl, e.g., β-acetoxyethyl; hydroxyl; nitro; alkylsulfonamido, e.g., methylsulfonamido; phenylalkoxy, e.g., benzyloxy; hydroxyalkoxy, e.g., β-hydroxyethoxy;

haloalkoxy, e.g., β-chloroethoxy; phenoxyalkoxy, e.g., β-phenoxyethoxy; β(β'-phenoxyalkoxy)alkoxy, e.g., β(β'-phenoxyethoxy)ethoxy; carboalkoxyalkyl, e.g., $$-(CH_2)_2COOCH_3$$

acylaminoalkyl, e.g., acetylaminoethyl; alkylcarbamoyl-alkyl, e.g., β-methylcarbamoylethyl; cyanoalkyl, e.g., β-cyanoethyl. The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for dyeing such hydrophobic materials they should be free of water-solubilizing groups such as sulfo and carboxy groups. In general, the dyes have good fastness, for example, to light, washing, gas (atmospheric fumes) and sublimation.

The following examples will serve to illustrate the preparation of representative intermediates and methine compounds of our invention.

EXAMPLE 1

(a) *Preparation of the carbamic acid ester.*—20.5 g. (0.1 m.) 2,7-dimethyl-1-(β-hydroxyethyl)-1,2,3,4 tetrahydroquinoline, prepared in the manner described in Example 37 below, 11.9 g. (0.1 m.) phenyl isocyanate, and 25 ml. benzene were refluxed 2 hours. The product crystallized out on cooling. The product was filtered off and recrystallized from 300 ml. of ethyl alcohol. The yield was 21 g., M.P. 139–141.5° C.

(b) *Preparation of the aldehyde.*—8.1 g. (.025 m.) of the ester prepared in (a) above was dissolved in 15 ml. of dry dimethylformamide. 3.0 ml. of phosphorus oxychloride was added with stirring and external cooling. The temperature during addition was kept below 25° C. When addition was complete, the reaction mixture was heated on the steam bath for 1 hour. It was then poured into 200 ml. of water. Ice was added and the mixture made basic with 10% aqueous sodium hydroxide. The product was a dark green oil which soon solidified. It was filtered off, washed with water, and recrystallized from 100 ml. of ethyl alcohol, yield—6.3 g., M.P. 122–124° C.

(c) *Preparation of the methine dye.*—8.8 g. of the aldehyde prepared in (b) above, 1.6 g. of malononitrile, 5 drops piperidine, and 150 ml. of ethyl alcohol were refluxed 1 hour. The mixture was chilled and filtered. Yield—8 g. This dye displays outstanding dyeing and fastness properties on cellulose acetate, polyester, and modacrylic fibers giving yellow shades thereon. The dye has the following structure:

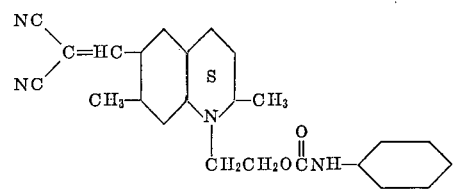

The methine compounds of the following table having Formula I above, wherein

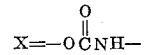

are prepared in the manner of Example 1 using the appropriate 1 - hydroxylalkyltetrahydroquinoline for conversion to the carbamic acid ester by reaction with the appropriate aliphatic or aromatic isocyanate, followed by formylation and reaction of the formyl group with the appropriate nitrile, i.e., malononitrile, alkylcyanoacetate or cyanoacetamide. Example 1 is included in the table for comparison purposes. These methine compounds dye cellulose acetate and polyester fibers in yellow shades having good fastness properties.

METHINE COMPOUNDS FORMULA I $$X=-O\overset{O}{\overset{\|}{C}}NH-$$

| Ex. | $R_3$ | $R_4$ | $R, R_1, R_2$ | $Y_{n-1}$ | Z |
|---|---|---|---|---|---|
| 1 | —CH$_2$CH$_2$— | Phenyl | 2-methyl | 7-methyl | —CN |
| 2 | —CH$_2$CH$_2$— | do | 2,2,4-trimethyl | do | —CN |
| 3 | —CH$_2$CH$_2$— | do | 2-isopropyl | do | —CN |
| 4 | —CH$_2$CH$_2$— | do | None | H | —CN |
| 5 | —CH$_2$CH$_2$— | do | 2-isopropyl | H | —CN |
| 6 | —CH$_2$CH$_2$— | do | 2-methyl | 7-methyl | —$\overset{O}{\overset{\|}{C}}$OCH$_2$CH(CH$_3$)$_2$ |
| 7 | —CH$_2$CH$_2$— | do | do | do | —$\overset{O}{\overset{\|}{C}}$—NH$_2$ |
| 8 | —CH$_2$CH$_2$— | do | do | 8-methyl, 5-methyl | —CN |
| 9 | —CH$_2$CH$_2$— | do | 2,4-dimethyl | 7-methyl | —CN |
| 10 | —CH$_2$CH$_2$— | n-Butyl | 2-methyl | do | —CN |
| 11 | —CH$_2$CH$_2$— | —CH$_2\overset{O}{\overset{\|}{C}}$OC$_2$H$_5$ | do | do | —CN |
| 12 | —CH$_2$CH$_2$— | Cyclohexyl | do | do | —CN |
| 13 | —CH$_2$CH$_2$— | 4'-methylphenyl | do | do | —CN |
| 14 | —CH$_2$CHOH—CH$_2$ | Phenyl | do | do | —CN |
| 14a | —CH$_2$CH$_2$— | do | do | do | —$\overset{O}{\overset{\|}{C}}$OCH$_2$CH$_2$CN |
| 14b | —CH$_2$CH$_2$— | do | do | do | —$\overset{O}{\overset{\|}{C}}$OCH$_2$CH$_2$OCH$_3$ |
| 14c | —CH$_2$CH$_2$— | do | do | do | —$\overset{O}{\overset{\|}{C}}$OC$_2$H$_5$ |
| 14d | —CH$_2$CH$_2$— | do | do | do | —$\overset{O}{\overset{\|}{C}}$OCH$_2$CH$_2$CH$_2$ |
| 14e | —CH$_2$CH$_2$— | do | do | do | —$\overset{O}{\overset{\|}{C}}$OCH$_2$C$_6$H$_5$ |
| 14f | —CH$_2$CH$_2$— | p-Chlorophenyl | do | do | —CN |
| 14g | —CH$_2$CH$_2$— | Ethyl | do | do | —CN |
| 14h | —CH$_2$CH$_2$— | 1-naphthyl | do | do | —CN |

EXAMPLE 15

(a) 20.5 grams of N-(β-hydroxyethyl)-2,7-dimethyl-1,2,3,4-tetrahydroquinoline, 23.7 g. of benzoic anhydride, 3 drops of conc. $H_2SO_4$ in 25 cc. of benzene were refluxed 3 hr. and allowed to cool. 200 cc. of 5% NaOH was added and the benzene layer separated. The aqueous layer was extracted with 100 cc. of ether and the combined organic layers were distilled, collecting the fraction B. 176–82° C./0.4 mm. $n_D^{20}=1.5819$.

(b) 6.18 g. of the benzoate prepared in (a) was dissolved in 5 cc. of dimethyl formamide. 2 cc. of $POCl_3$ was added below 30° C., and the mix then heated 1 hr. on the steam-bath. The mix was drowned in 100 cc. of water, made basic with aqueous NaOH, obtaining a viscous oil, which was washed well by decantation.

(c) 3.37 g. of the aldehyde from (b), 0.66 g. of malononitrile, 1 drop of piperidine and 10 cc. of ethanol were refluxed 2 hr. After cooling, the mix was filtered, obtaining a product which dyed cellulose acetate and polyesters in bright yellow shades.

The methine compounds of the following table, having Formula I above wherein

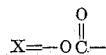

are prepared in the manner of Example 15 using the appropriate 1-hydroxyalkyltetrahydroquinoline for conversion to the ester by reaction with aliphatic or aromatic acid anhydrides, followed by formylation and reaction of the formyl group with the appropriate nitrile, i.e., malononitrile or alkylcyanoacetate. The methine compounds dye cellulose acetate and polyester fibers in fast yellow shades.

cc. benzene were refluxed together for one hour. On cooling, the white solid was recrystallized from alcohol and then melted at 154–155° C.

(b) 6.4 g. of the urea derivative prepared in (a) in 6 cc. of dimethylformamide was treated with 2 cc. $POCl_3$ below 30° C. After heating on the steam bath 1 hr. the mix was poured into water and allowed to stand 2 hr. at room temperature. The aldehyde was filtered off, washed with water and air-dried. The product was a waxy solid.

(c) 0.35 g. of the product of (b), 0.7 g. malononitrile and 1 drop of piperidine in 5 cc. alcohol were boiled 2–3 min. The chilled mix was filtered, obtaining a product which imparted fast bright shades to polyesters and cellulose acetate.

The methine compounds of the following table having Formula I above, wherein X=—NHCONH—, are prepared in the manner of Example 21 using the appropriate 1-aminoalkyltetrahydroquinoline for conversion to the urea derivative by reaction with the appropriate aliphatic or aromatic isocyanate, followed by formylation and reaction of the formyl group with the appropriate nitrile, i.e., malononitrile, alkylcyanoacetate or cyanoacetamide. Example 21 is included in the table for comparison purposes. These methine compounds dye cellulose acetate and polyester fibers in fast yellow shades.

METHINE COMPOUNDS FORMULA I
X=—NHCONH—

| Ex. | $R_3$ | $R_4$ | R, $R_1$, $R_2$ | $Y_{n1}$ | Z |
|---|---|---|---|---|---|
| 21 | —$CH_2CH_2$— | Phenyl | 2-methyl | 7-methyl | —CN |
| 22 | —$CH_2CH_2$— | do | 2-isopropyl | H | —CN |
| 23 | —$CH_2CH_2$— | do | 2,2,4-trimethyl | 7-methyl | —CN |
| 24 | —$CH_2CH_2$— | do | 2-methyl | do | —$\overset{O}{\overset{\|}{C}}NH_2$ |
| 25 | —$CH_2CH_2$— | do | do | do | —$\overset{O}{\overset{\|}{C}}OCH_2CH(CH_3)_2$ |
| 26 | —$CH_2CH_2$— | n-Butyl | 2-isopropyl | do | —CN |
| 27 | —$CH_2CH_2CH_2$— | Phenyl | 2-methyl | do | —CN |

The methine compounds of the following table, having Formula I wherein X=—NHCOO—, are prepared as described in Example 39 below using the appropriate 1-aminoalkyltetrahydroquinoline for conversion to the carbamate by reaction with the appropriate alkyl chloroformate, followed by formylation and reaction of the formyl group with the appropriate nitrile, i.e., malono- METHINE COMPOUNDS FORMULA I
$$X=—O\overset{O}{\overset{\|}{C}}—$$

| Ex. | $R_3$ | $R_4$ | R, $R_1$, $R_2$ | $Y_{n-1}$ | Z |
|---|---|---|---|---|---|
| 15 | —$CH_2CH_2$— | Phenyl | 2-methyl | 7-methyl | —CN |
| 16 | —$CH_2CH_2$— | Methyl | do | do | —CN |
| 17 | —$CH_2CH_2$— | Cyclohexyl | do | do | —CN |
| 18 | —$CH_2CH_2$— | 4'-methylphenyl | do | do | —CN |
| 19 | —$CH_2CH_2$— | Phenyl | None | H | —CN |
| 20 | —$CH_2CH_2$— | Phenyl | 2-methyl | 7-methyl | —$\overset{O}{\overset{\|}{C}}OCH_2CH(CH_3)_2$ |

EXAMPLE 21

(a) 20.4 g. of N-(β-aminoethyl)2,7-dimethyl-1,2,3,4-tetrahydroquinoline, 11.9 g. phenylisocyanate and 100 nitrile, alkylcyanoacetate or cyanoacetamide. The methine compounds produce brilliant fast yellow shades on cellulose acetate and polyester fibers.

METHINE COMPOUNDS FORMULA I,
X=—NHCOO—

| Ex. | $R_3$ | $R_4$ | $R, R_1, R_2$ | $Y_{n-1}$ | Z |
|---|---|---|---|---|---|
| 28 | —CH$_2$CH$_2$— | Ethyl | 2-methyl | 7-methyl | —CN |
| 29 | —CH$_2$CH$_2$CH$_2$— | do | do | do | —CN |
| 30 | —CH$_2$CH$_2$— | do | do | 8-methyl, 5-methyl | —CN |
| 31 | —CH$_2$CH$_2$— | n-Butyl | 2,2,4-trimethyl | 7-methyl | —CN |
| 32 | —CH$_2$CH$_2$— | do | 2-isopropyl | do | —CN |
| 33 | —CH$_2$CH$_2$— | do | 2,4-dimethyl | do | —CN |
| 34 | —CH$_2$CH$_2$— | do | 2-methyl | H | —CN |
| 35 | —CH$_2$CH$_2$— | do | 2-methyl | 7-methyl | —C(=O)NH$_2$ |
| 36 | —CH$_2$CH$_2$— | do | do | do | —C(=O)OCH$_2$CH(CH$_3$)$_2$ |

EXAMPLE 37

(a) *N-β-hydroxyethyl - 2,2,4,7 - tetramethyl - 1,1,3,4-tetrahydroquinoline.*—113 g. of 2,2,4,7-tetramethyl-1,2,3,4-tetrahydroquinoline, 33 g. of ethylene oxide and 450 cc. ethanol were heated in an autoclave at 180° C. for 1 hr. The ethanol was distilled off, and 200 cc. hexane added. The resulting white solid was filtered off, washed with hexane and dried. M.P. 86–88° C.

(b) *Preparation of the carbamate.*—11.6 g. of the product from (a), 5.95 g. of phenylisocyanate and 100 cc. of benzene were refluxed 2 hr. and the solvent distilled off. The product was a viscose oil.

(c) *Preparation of the aldehyde.*—17.6 g. of the product of (b) was dissolved in 20 cc. of dimethyl formamide and cooled in the ice-bath. 5.5 g. of POCl$_3$ was added slowly below 30° C. The mix was then heated 1 hr. on the steam bath and poured onto 200 cc. cracked ice. The mix was made basic with NaOH, the product coming down as a thick greenish oil.

(d) *Dye preparation.*—7.6 g. of (c), 1.32 g. of malononitrile, 3 drops of piperidine and 30 cc. of ethanol was refluxed 1 hr. The mix was chilled, filtered and the product washed and air-dried. It melts at 169–171° C., and imparts fast yellow shades to Dacron and Kodel polyester fibers and cellulose acetate fibers.

EXAMPLE 38

(a) 13.1 g. of 7-ethoxy-N-β-hydroxyethyl-2-isopropyl-1,2,3,4-tetrahydroquinoline, 6.0 g. of phenylisocyanate and 100 cc. of benzene were refluxed 2 hr. The benzene was distilled off and the residue dissolved in 100 cc. of hot alcohol. After chilling the product was filtered off and air-dried. M.P. 103–4° C.

(b) 7.6 g. of the product of (a) was dissolved in 10 cc. dimethylformamide and 3 cc. of POCl$_3$ added below 25° C. After heating 1 hr. on the steam-bath, it was drowned in 200 cc. of water and made basic with 10% NaOH. The viscous oil was dissolved in 75 cc. hot alcohol and chilled. The product was filtered off and dried. M.P. 96–7° C.

(c) 1.02 g. of the aldehyde prepared in (b), 0.17 g. malononitrile, 3 drops piperidine and 10 cc. alcohol were refluxed 1 hr. After cooling, the dye was filtered off and air-dried. It dyes polyesters and cellulose acetate bright, fast yellow shades.

EXAMPLE 39

(a) 20.4 g. of N-(β-aminoethyl)-2,7-dimethyl-1,2,3,4-tetrahydroquinoline (B.P. 120–30° C./0.2–0.55 mm.), 10 g. of ethylchloroformate and 90 cc. of benzene were refluxed 1 hr. Upon chilling a solid separated out and was filtered off and air-dried. The product melts at 123–5° C.

(b) 6 g. of the carbamate prepared in (a) in 6 cc. of dimethylformamide was treated with 2 cc. POCl$_3$ below 30° C. Upon working up as usual a viscous oil was obtained.

(c) 3.03 g. of the aldehyde prepared in (b), 0.66 g. of malononitrile in 15 cc. of alcohol were refluxed 15 min. After chilling a solid product was obtained. It imparted bright yellow shades to hydrophobic fibers.

EXAMPLE 40

(a) 50 g. of N-(β-aminoethyl)-2,7-dimethyl-1,2,3,4-tetrahydroquinoline was slurried in 500 cc. of water. 25 g. of acetic anhydride was added dropwise with good stirring, the temperature rising to 35° C. After 2 hr. further stirring the solid was filtered off, washed with water and air-dried. M.P. 103–5° C.

(b) 12.3 g. of the amide obtained in (a) was dissolved in 20 cc. of dimethylformamide by warming. The solution was cooled to 15° C. and 5.5 cc. of POCl$_3$ was stirred in, keeping the temperature below 20° C. The mix was then heated 1.5 hr. on the steam bath, drowned on ice and made basic with 10% NaOH. The aldehyde was extracted from the mix with chloroform, washed with water, dried over anhydrous sodium sulfate, and the chloroform removed in vacuo. The product was a viscous oil.

(c) 2.74 g. of the aldehyde prepared in (b), 0.99 g. of methyl cyanoacetate, 3 drops of piperidine and 15 cc. of ethanol were refluxed for 6 hr. After chilling, the product was filtered off and air-dried. It dyed cellulose acetate in brilliant yellow shades.

The methine compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be affected, for example, by incorporating the methine compounds into the spinning dope and spinning the fiber as usual. The methine compounds of our invention have varying utility as dyes. The degree of utility varies, for example, depending upon the material being dyed and the formula of the methine compound. Thus, for example, all the dyes will not have the same degree of utility for the same material.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A methine compound having the formula

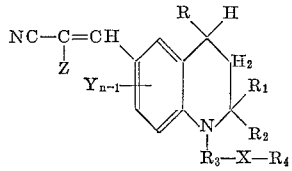

wherein:
$R$, $R_1$, and $R_2$ each=a member of the class consisting of hydrogen and lower alkyl,
$R_3$=lower alkylene,
$R_4$=a member of the class consisting of lower alkyl, lower cycloalkyl and monocyclic carbocyclic aryl,
$X$=a group of the class consisting of $$-O\overset{O}{\underset{\|}{C}}-, -OCONH-, -NHCONH-, -NHCO- \text{ and } -NHCOO-$$

$Y$=a member of the class consisting of lower alkyl and lower alkoxy,
$n$=a positive integer from 1 to 4, and
$Z$=a radical of the class consisting of cyano, amido, and lower carboalkoxy.

2. Methine compounds having the formula

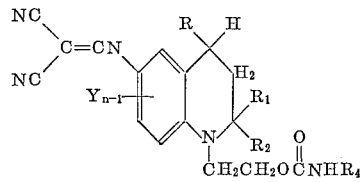

wherein at least on of the substituents $Y_{n-1}$, $R$, $R_1$ and $R_2$ represents a methyl group when the others are hydrogen atoms, $n$ represents a positive integer from 1 to 4, and $R_4$ represents monocyclic carboxylic aryl.

3. The compound

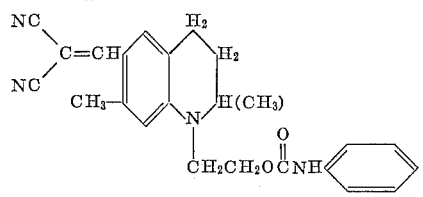

4. The compound

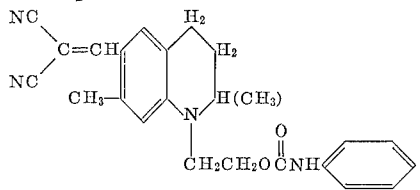

5. The compound

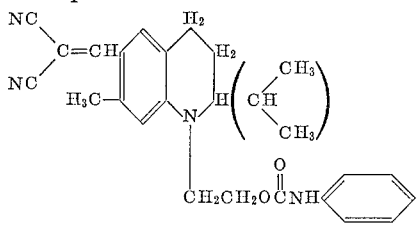

6. The compound

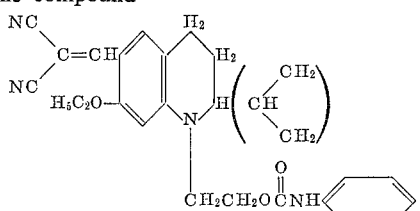

7. The compound

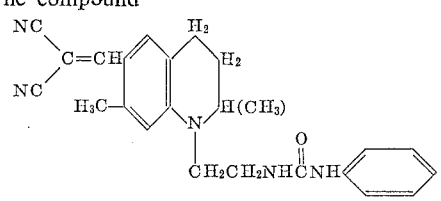

8. A methine compound having the formula

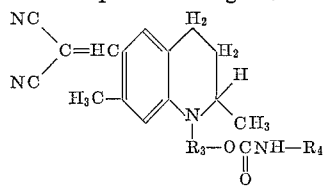

wherein $R_3$ represents lower alkylene and $R_4$ is monocyclic carbocyclic aryl.

9. A methine compound having the formula

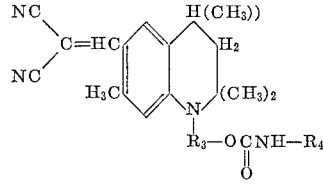

wherein $R_2$ represents lower alkylene and $R_4$ is monocyclic carbocyclic aryl.

References Cited by the Examiner

UNITED STATES PATENTS

| | | | |
|---|---|---|---|
| 2,220,129 | 11/1940 | Stott | 8—55 |
| 2,330,203 | 9/1943 | Brooker et al. | 260—240.4 |
| 2,556,146 | 6/1951 | Olsen | 260—287 |
| 2,600,380 | 6/1952 | Derek | 260—287 |
| 3,023,213 | 2/1962 | Richter | 260—287 |
| 3,036,876 | 5/1962 | Schoellig et al. | 8—55 |

OTHER REFERENCES

United States Publication Board, Report No. 70,336, Frames 7613–7616, April 15, 1936.

NICHOLAS S. RIZZO, *Primary Examiner.*

JOHN D. RANDOLPH, *Examiner.*